United States Patent
Yamamoto et al.

(10) Patent No.: US 6,495,218 B1
(45) Date of Patent: Dec. 17, 2002

(54) LIQUID CRYSTAL MEDIUM AND ELECTRO-OPTIC LIQUID CRYSTAL DISPLAYS

(75) Inventors: Hitoshi Yamamoto, Shiga (JP); Kanetsugu Terashima, Shiga (JP); Hiroaki Kawashukuda, Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/555,955
(22) PCT Filed: Oct. 6, 1999
(86) PCT No.: PCT/JP99/05502
§ 371 (c)(1), (2), (4) Date: Jun. 7, 2000
(87) PCT Pub. No.: WO00/20529
PCT Pub. Date: Apr. 13, 2000

(30) Foreign Application Priority Data

Oct. 7, 1998 (JP) ............................................. 10-285055

(51) Int. Cl.[7] .................. C09K 19/30; C09K 19/12; C09K 19/20
(52) U.S. Cl. .............. 428/1.1; 252/299.63; 252/299.66; 252/299.67
(58) Field of Search ........................ 252/299.63, 299.66, 252/299.67; 428/1.1

(56) References Cited

U.S. PATENT DOCUMENTS

| | | | |
|---|---|---|---|
| 4,877,548 A | 10/1989 | Kitano et al. | |
| 5,919,396 A | 7/1999 | Tarumi et al. | |

(List continued on next page.)

FOREIGN PATENT DOCUMENTS

| | | |
|---|---|---|
| EP | 325796 | 8/1989 |
| GB | 2323601 | 9/1998 |

(List continued on next page.)

OTHER PUBLICATIONS

Abstracts of PCT Pub No. WO91/10936 supplied from the esp@cenet database and from Derwent Information Ltd, 1991.

(List continued on next page.)

*Primary Examiner*—Shean C. Wu
(74) *Attorney, Agent, or Firm*—Wenderoth, Lind & Ponakc, L.L.P.

(57) ABSTRACT

Provided is a liquid crystal medium for an electro-optical liquid crystal display of an IPS mode which does not cause burning and which is suitable for achieving a relatively low threshold voltage and a short response time.

The liquid crystal medium for an IPS mode display comprising 5 to 37.5% by weight of the first component (compound of Formula I) and 5 to 62.5% by weight of the second component (compound of Formula II)

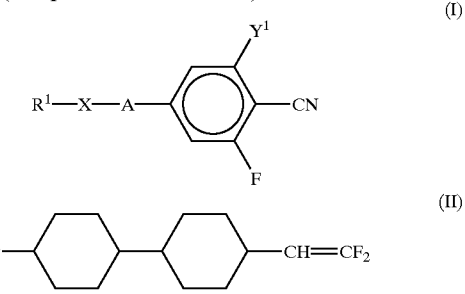

or the liquid crystal medium comprising 100% by weight of the first component, 5 to 62.5% by weight of the second component and 5 to 37.5% by weight of third component (compound of Formula III):

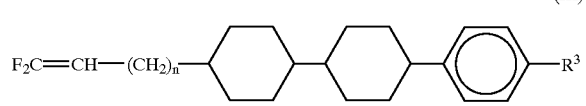

wherein $R^1$ to $R^3$ represent a $C_1$ to $C_{10}$ alkyl group, an alkoxy group or an oxalkyl group (containing 1 to 4 oxygen atoms), or a $C_2$ to $C_{10}$ alkenyl group; X represents transcyclohexylene or phenylene; A represents —CO—O— or a single bond; and $Y^1$ represents a hydrogen atom or a fluorine atom.

18 Claims, 2 Drawing Sheets

U.S. PATENT DOCUMENTS

| | | | | |
|---|---|---|---|---|
| 5,976,407 A | * | 11/1999 | Tarumi et al. | 252/299.01 |
| 5,993,691 A | * | 11/1999 | Pausch et al. | 252/299.63 |
| 6,045,878 A | * | 4/2000 | Tarumi et al. | 428/1.1 |
| 6,080,452 A | * | 6/2000 | Tarumi et al. | 428/1.1 |
| 6,248,260 B1 | * | 6/2001 | Haseba et al. | 252/299.66 |
| 6,254,941 B1 | * | 7/2001 | Kondou et al. | 428/1.1 |
| 6,326,065 B1 | * | 12/2001 | Haseba et al. | 428/1.1 |
| 6,344,247 B1 | * | 2/2002 | Kondou et al. | 428/1.1 |

FOREIGN PATENT DOCUMENTS

| | | | |
|---|---|---|---|
| JP | | 9-125063 | 5/1997 |
| JP | | 10-102060 | 4/1998 |
| JP | | 10-168454 | 6/1998 |
| WO | | 98/27036 * | 6/1998 |

OTHER PUBLICATIONS

Abstracts of EPO588568 supplied from the *esp@cenet* database and from Derwent Information Ltd, 1994.

Soref, "Field effects in nematic liquid crystals obtained with interdigital electrodes", Journal of Applied Physics, vol. 45, No. 12, Dec. 1974, pp. 5466–5468.

* cited by examiner

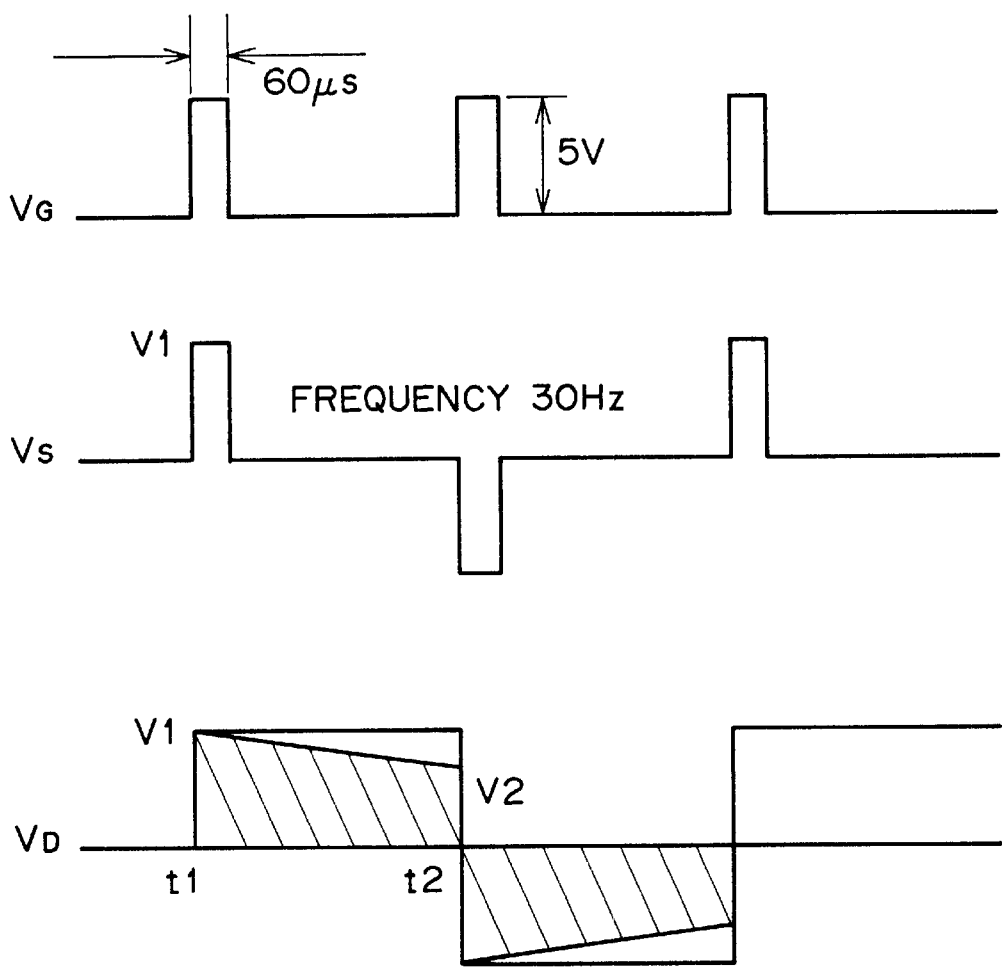

LIQUID CRYSTAL MEDIUM AND ELECTRO-OPTIC LIQUID CRYSTAL DISPLAYS

This application is a 371 application of PCT/JP99/05502 filed Oct. 6, 1999

TECHNICAL FIELD

The present invention relates to a liquid crystal medium for a liquid crystal display and an electro-optical liquid crystal display using the same. More specifically, the present invention relates to an electro-optical liquid crystal display {so-called in-plane switching mode (IPS mode) display in which an electric field for re-aligning a liquid crystal layer works parallel to the liquid crystal layer} having a re-aligning layer for re-aligning a liquid crystal in which an electric field therefor has an effective ingredient parallel to the liquid crystal layer and containing a liquid crystal medium having a positive dielectric anisotropy and to a liquid crystal medium used for the same electro-optical liquid crystal display.

BACKGROUND ART

In conventional liquid crystal displays (TN, STN, OMI and AMD-TN), a great part of an electric field working for re-alignment operates vertically to a liquid crystal layer. A liquid crystal display in which an electric field gives electric signals in such a mode that the electric field has an effective structural element parallel to a liquid crystal layer is described in International Patent Application WO 91/10936 [in-plane switching (IPS)]. Such operation principle of a display is described in, for example, A. Soref, Journal of Applied Physics, Vol. 45, No. 12, p.5466 to 5468 (1974). Possibility of various addresses in such a display is disclosed in EP 0588 568.

These IPS displays can be operated by using a liquid crystal material having either positive or negative dielectric anisotropy ($\Delta\epsilon \neq 0$). However, use of conventionally known materials allows the IPS displays to cause a image sticking and result in having a relatively high threshold voltage and a long response time. Accordingly, there has been present in the IPS displays, a subject to clarify liquid crystal materials which do not cause burning and are suitable for achieving a relatively low threshold voltage and a short response time. It is described in, for example, Japanese Patent Application Laid-Open No. 125063/1997 that used is a liquid crystal medium characterized by containing at least one compound containing a 4-cyclohexylcarbonyloxy) benzonitrile group which is laterally substituted with fluorine, whereby the rotational viscosity coefficient ($\gamma_1$) has been reduced to 80 to 120 mPa. second. However, it has never been described therein to inhibit burning from being produced.

DISCLOSURE OF THE INVENTION

As apparent from the descriptions given above, an object of the present invention is to provide a liquid crystal medium which is suitable for an IPS mode causing no burning and achieving a relatively low threshold voltage and a considerably short response time and an electro-optical liquid crystal display of the IPS mode comprising the same.

The liquid crystal composition of the present invention comprises the following structures:
(1) A liquid crystal medium used for an in-plane switching mode (a so-called IPS mode in which an electric field for re-aligning a liquid crystal layer works parallel to the liquid crystal layer) display, comprising 5 to 37.5% by weight of at least one compound as a first component selected from the group consisting of compounds represented by Formula (I), 5 to 62.5% by weight of at least one compound as a second component selected from the group consisting of compounds represented by Formula (II) and the balance of another liquid crystal compound containing crystal medium having a positive dielectric anisotropy, wherein the first component is a compound represented by Formula (I):

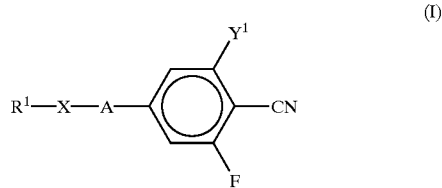

(wherein $R^1$ represents an alkyl group, an alkoxy group or an oxalkyl group (containing 1 to 4 oxygen atoms) having 1 to 10 carbon atoms, or an alkenyl group having 2 to 10 carbon atoms; X represents transcyclohexylene or phenylene; A represents —CO—O— or a single bond; and $Y^1$ represents a hydrogen atom or a fluorine atom), and the second component is a compound represented by Formula (II)

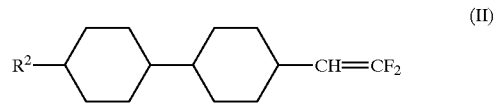

(wherein $R^2$ represents an alkyl group, an alkoxy group or an oxalkyl group (containing 1 to 4 oxygen atoms) having 1 to 10 carbon atoms, or an alkenyl group having 2 to 10 carbon atoms).

(2) A liquid crystal medium used for an in-plane switching mode (IPS mode) display, comprising 5 to 37.5% by weight of at least one compound as a first component selected from the group consisting of compounds represented by Formula (I), 5 to 62.5% by weight of at least one compound as a second component selected from the group consisting of compounds represented by Formula (II), 5 to 37.5% by weight of at least one compound as a third component selected from the group consisting of compounds represented by Formula (III) and the balance of another liquid crystal compound containing a liquid crystal medium having a positive dielectric anisotropy, wherein the first component is a compound represented by Formula (I):

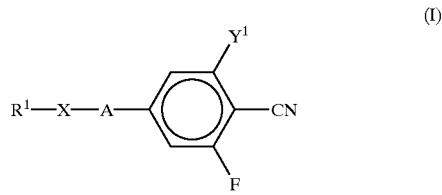

(wherein $R^1$ represents an alkyl group, an alkoxy group or an oxalkyl group (containing 1 to 4 oxygen atoms) having 1 to 10 carbon atoms, or an alkenyl group having 2 to 10 carbon atoms; X represents transcyclohexylene or phenylene; A represents —CO—O— or a single bond; and $Y^1$ represents a hydrogen atom or a fluorine atom); the second component is a compound represented by Formula (II):

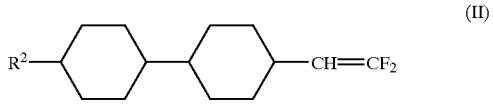

(wherein $R^2$ represents an alkyl group, an alkoxy group or an oxalkyl group (containing 1 to 4 oxygen atoms) having 1 to 10 carbon atoms, or an alkenyl group having 2 to 10 carbon atoms); and the third component is a compound represented by Formula (III):

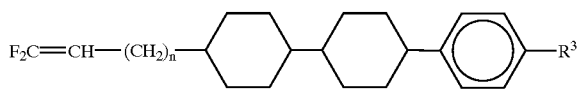

(wherein n is 0 or 2, and $R^3$ represents an alkyl group, an alkoxy group or an oxalkyl group (containing 1 to 4 oxygen atoms) having 1 to 10 carbon atoms, or an alkenyl group having 2 to 10 carbon atoms).

(3) The liquid crystal medium for an IPS mode display as described in the above item (1), comprising the compound represented by Formula (I) in which X is phenylene, and A is —CO—O—.

(4) The liquid crystal medium for an IPS mode display as described in the above item (2), comprising the compound represented by Formula (I) in which X is phenylene, and A is —CO—O—.

(5) The liquid crystal medium for an IPS mode display as described in the above item (2), comprising the compound represented by Formula (I) in which $R^1$ is a linear alkenylgroup having 2 to 10 carbon atoms and X is phenylene and in which A is —CO—O—; the compound represented by Formula (II) in which $R^2$ is a linear alkyl group having 1 to 10 carbon atoms or a linear alkenyl group having 2 to 10 carbon atoms; and the compound represented by Formula (III) in which $R^3$ is a linear alkyl group having 1 to 10 carbon atoms or a linear alkenyl group having 2 to 10 carbon atoms.

(6) The liquid crystal medium for an IPS mode display as described in any one of the above items (1) to (5), wherein the volttage holding ratio is controlled to 40 to 90%.

(7) An active matrix type liquid crystal display element for an IPS mode display, characterized by comprising the liquid crystal medium as described in any one of the above items (1) to (6), wherein a product of a optical anisotropy (Δn) and a cell thickness (d) of the liquid crystal medium has a value falling in a range of 200 to 350 nm.

(8) An IPS mode display provided with the liquid crystal display element as described in the above item (7).

BRIEF DESCRIPTION OF THE DRAWINGS

FIG. 3 is a drawing showing a driving wave form and a measuring wave form in measuring the volttage holding ratio.

BEST MODE FOR CARRYING OUT THE INVENTION

Figure 1:
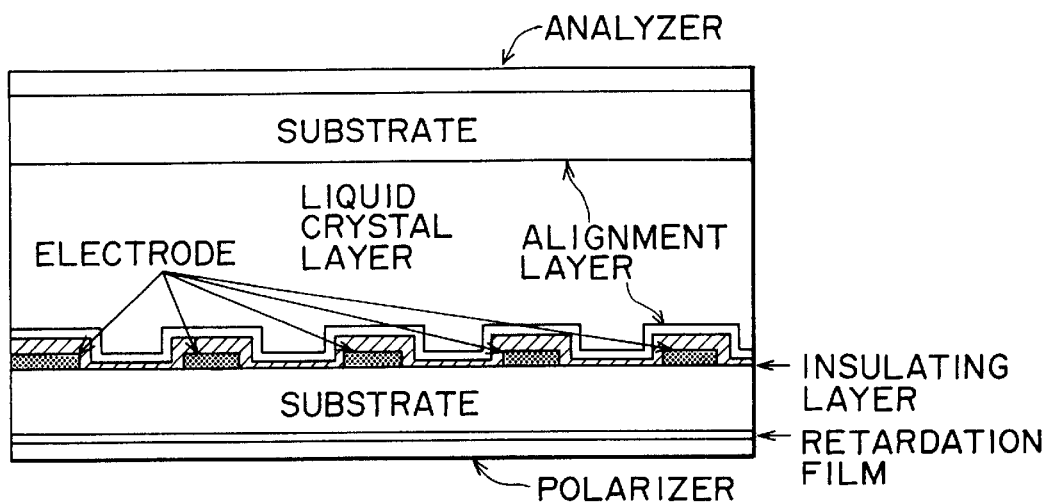
FIG. 1 is a drawing showing an IPS test cell having a comb-shaped structure.

The present invention shall be explained below in detail.

In the liquid crystal medium as described in the above item (1), the problem described above has been intended to be solved by adding 6.25 to 37.5% by weight of at least one compound as the first component selected from the group consisting of the compounds represented by Formula (I) and 6.25 to 62.5% by weight of at least one compound as the second component selected from the group consisting of the compounds represented by Formula (II), respectively.

Next, the compounds for the respective components constituting the liquid crystal medium of the present invention shall be explained.

The compound represented by Formula (I) constituting the first component has a very large positive dielectric anisotropy and a relatively low viscosity. Addition of this first component to the other liquid crystal compound or liquid crystal medium makes it possible to control the volttage holding ratio between 40 to 90% and reduce the threshold voltage of the liquid crystal medium.

These compounds assume an important role for providing the liquid crystal medium achieving a relatively low threshold voltage in the present invention. The compound in which $R^1$ represents a linear alkyl group having 1 to 7 carbon atoms or a linear alkenyl group having 2 to 7 carbon atoms is preferred as the compound of the present invention represented by Formula (I).

The compound represented by Formula (II) constituting the second component has a relatively high NI transition temperature, a positive dielectric anisotropy and a very low viscosity. Addition of this second component to the other liquid crystal compound or liquid crystal medium makes it possible to reduce the viscosity of the liquid crystal composition.

These compounds assume an important role for providing the liquid crystal medium achieving a particularly short response time in the present invention. The compound in which $R^2$ represents a linear alkyl group having 1 to 7 carbon atoms or a linear alkenyl group having 2 to 7 carbon atoms is preferred as the compound of the present invention represented by Formula (II).

The compound represented by Formula (III) constituting the third component has a high NI transition temperature, a relatively large positive dielectric anisotropy and a relatively low viscosity. Addition of this third component to the other liquid crystal compound or liquid crystal medium makes it possible to elevate the NI transition temperature of the liquid crystal medium and reduce the viscosity.

These compounds assume an important role for providing the liquid crystal medium achieving a particularly high NI transition temperature and a short response time in the present invention. The compound in which $R^3$ represents a linear alkyl group having 1 to 7 carbon atoms or a linear alkenyl group having 2 to 7 carbon atoms is preferred as the compound of the present invention represented by Formula (III).

A mixing proportion of the compound represented by Formula (I) which is the first component in the liquid crystal medium of the present invention as described in the above item (1) is preferably 6.25 to 37.5% by weight based on the whole weight of the liquid crystal medium. If the mixing proportion is less than 6.25% by weight, the reduced threshold voltage which is the subject in the present invention can not be achieved.

On the other hand, if the mixing proportion exceeds 37.5% by weight, the resulting liquid crystal medium is increased in a viscosity, and therefore it is not preferred.

Similarly, a mixing proportion of the compound represented by Formula (II) which is the second component is preferably 6.25 to 62.5% by weight based on the whole weight of the liquid crystal medium. If the mixing proportion is less than 6.25% by weight, the reduced viscosity which is the subject in the present invention can not be achieved.

On the other hand, if the mixing proportion exceeds 62.5% by weight, the resulting liquid crystal medium is reduced in an NI transition temperature or increased in a threshold voltage, and therefore it is not preferred.

A mixing proportion of the compound represented by Formula (III) which is the third component in the liquid crystal medium of the present invention as described in the above item. (2) is preferably 6.25 to 37.5% by weight based on the whole weight of the liquid crystal medium. If the mixing proportion is less than 6.25% by weight, the elevated NI transition temperature and the reduced viscosity which are the subjects in the present invention can not be achieved.

On the other hand, if the mixing proportion exceeds 37.5% by weight, the resulting liquid crystal medium is increased in a threshold voltage, and therefore it is not preferred.

The liquid crystal medium of the present invention can contain other compounds than the compounds represented by Formulas (I) to (III) described above in suitable amounts for the purpose of adjusting a threshold voltage, a nematic phase temperature range, Δn and a viscosity of the resulting liquid crystal medium according to the objects of the liquid crystal display element used as long as the objects of the present invention are not damaged. The following compounds can be given as examples of such compounds:

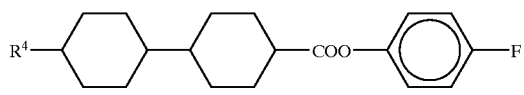

(IV)

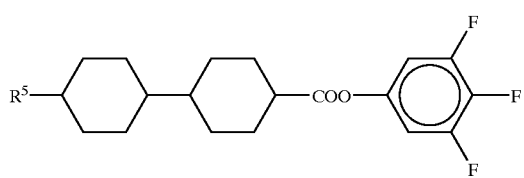

(V)

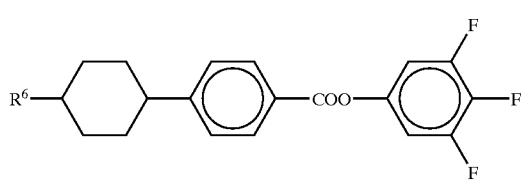

(VI)

In the formulas described above, $R^4$, $R^5$ and $R^6$ each represent independently a linear alkyl group having 1 to 10 carbon atoms.

EXAMPLES

The present invention shall be explained below in detail with reference to examples, but the present invention shall not be restricted to these examples.

Liquid crystal compounds used in the examples and the comparative examples are shown based on a notation using abbreviated codes shown in the following Table 1. Notation examples represented by formulas are shown in Table 2 and Table 3.

All compositions in the examples and the comparative examples are shown by % by weight. Codes of the physical properties shall mean the following:

SN: smectic-nematic phase transition temperature (°C.)
NI: nematic-isotropic phase transition temperature (° C.)
$\gamma_1$ : rotational viscosity coefficient (mPa·sec) at 25° C.
Δε: dielectric anisotropy,(-) at 1 kHz and 25° C.
Δn: optical anisotropy (-) in 589 nm at 25° C.
V.H.R.: volttage holding ratio (%) at 25° C.

An IPS test cell having a comb-shaped structure shown in FIG. 1 was used to determine the address voltage and the response time and observe the image sticking. In this case, the electrodes were provided at an interval of 10 μm. This liquid crystal material had a layer thickness of 3.5 μm. Further, this cell had the following characteristics:

Initial twist angle: 0°
Aligning angle: 4°
Tilt angle: 2°

This cell is dark in a condition of voltage-off.

Figure 2:
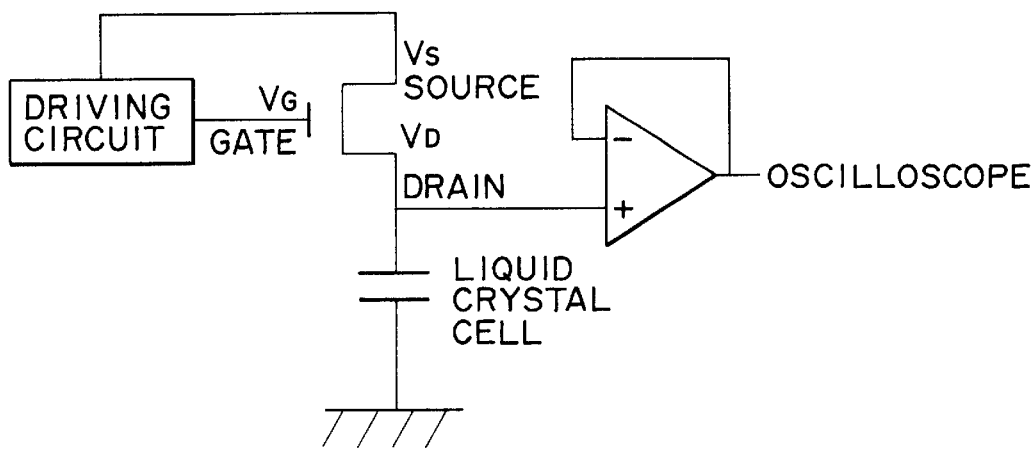
FIG. 2 is a drawing showing a circuit for determining a volttage holding ratio.

A circuit shown in FIG. 2 was used to determine the volttage holding ratio of liquid crystal medium. The wave form in measurement was shown in FIG. 3, and the wave form actually observed was illustrated in an obliquely lined part in $V_D$. The voltage holding ratio was shown by a ratio of an area of the obliquely lined part ($V_1$-$t_1$-$t_2$-$V_2$) in FIG. 2 to an area shown by a product [($V_1$)×($t_1$-$t_2$)] of the source voltage ($V_1$) and the applied time ($t_1$-$t_2$).

TABLE 1

R—(A₁)—Z₁—...—Zₙ—(Aₙ)—X

| 1) Left terminal group R— | Symbol |
|---|---|
| $C_nH_{2n+1}$— | n- |
| $C_nH_{2n+1}O$— | nO— |
| $C_nH_{2n+1}OC_mH_{2m}$— | nOm- |
| $CH_2=CHC_nH_{2n}$— | Vn- |
| $C_nH_{2n+1}CH=CHC_mH_{2m}$— | nVm- |
| $C_nH_{2n+1}CH=CHC_mH_{2m}CH=CHC_kH_{2k}$— | nVmVk- |
| $CF_2=CH$— | F2V— |

| 2) Ring structure —(A₁)—, —(Aₙ)— | Symbol |
|---|---|
| [cyclohexane/phenyl ring] | B |
| [phenyl with F] | B(F) |
| [phenyl with F,F] | B(F,F) |

TABLE 1-continued

R—(A₁)—Z₁—...—Zₙ—(Aₙ)—X

| Structure | Symbol |
|---|---|
| cyclohexane | H |
| pyrimidine | Py |
| dioxane | D |

| 3) Bonding group —Z₁—, —Zₙ— | Symbol |
|---|---|
| —C₂H₄— | 2 |
| —COO— | E |
| —CH=CH— | V |
| —CF₂O— | CF2O |

| 4) Right terminal group —X | Symbol |
|---|---|
| —F | —F |
| —Cl | —CL |
| —CN | —C |
| —CF₃ | —CF3 |
| —OCF₃ | —OCF3 |
| —OCF₂H | —OCF2H |
| —CₙH$_{2n+1}$ | -n |
| —OCₙH$_{2n+1}$ | —On |
| —COOCH₃ | -EMe |
| —CH=CF₂ | —VF2 |

TABLE 1-continued

R—(A₁)—Z₁—...—Zₙ—(Aₙ)—X

5) Notation example

Example 1   1V2—BEB(F,F)—C

Example 2   3-HH—VF2

Example 3   3-HHEB(F,F)—F

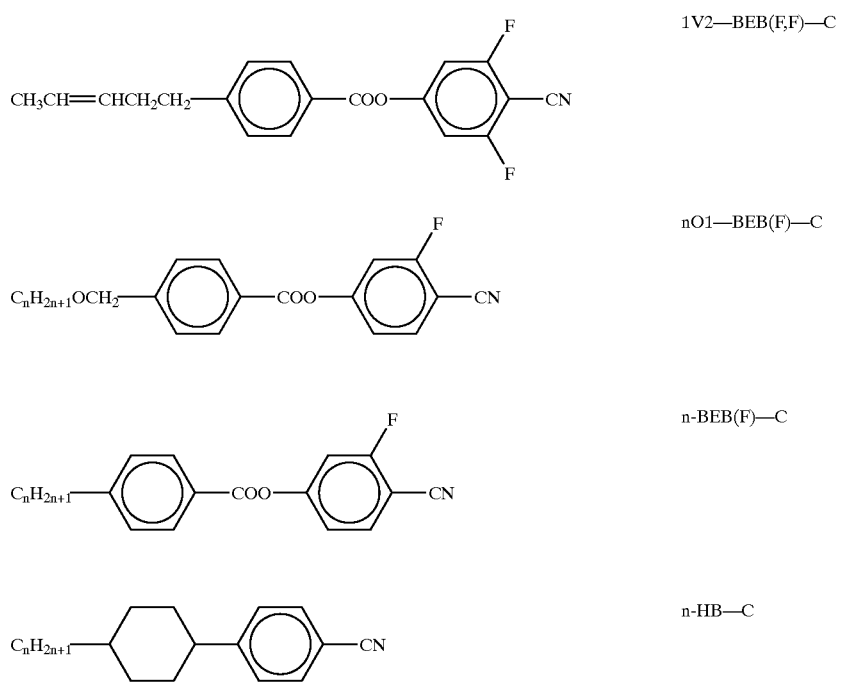

TABLE 2

1V2—BEB(F,F)—C nO1—BEB(F)—C n-BEB(F)—C n-HB—C

TABLE 2-continued

| Structure | Name |
|---|---|
| $C_nH_{2n+1}$—[Cy]—[Ph(F)]—CN | n-HB(F)—C |
| $C_nH_{2n+1}$—[Cy]—[Ph]—CL | n-HB—CL |
| $C_mH_{2m+1}$—[Cy]—[Ph]—$OC_nH_{2n+1}$ | m-HB—On |
| $C_mH_{2m+1}$—[Cy]—[Cy]—$C_nH_{2n+1}$ | m-HH-n |
| $C_nH_{2n+1}$—[Cy]—[Ph]—CH=$CF_2$ | n-HH—VF2 |
| $CF_2$=CH—[Cy]—[Cy]—[Ph]—$C_nH_{2n+1}$ | F2V—HHB-n |
| $CF_2$=CH—$C_mH_{2m+1}$—[Cy]—[Cy]—[Ph]—$C_nH_{2n+1}$ | F2Vm-HHB-n |

TABLE 3

| Structure | Name |
|---|---|
| $C_nH_{2n+1}$—[Cy]—[Cy]—[Ph(F,F,F)] | n-HHB(F,F)—F |
| $C_nH_{2n+1}$—[Cy]—[Cy]—[Ph(F,F)] | n-HHB(F)—F |
| $C_nH_{2n+1}$—[Cy]—$C_2H_4$—[Cy]—[Ph(F,F,F)] | n-H2HB(F,F)—F |
| $C_nH_{2n+1}$—[Cy]—[Ph]—[Ph(F,F,F)] | n-HBB(F,F)—F |

TABLE 3-continued

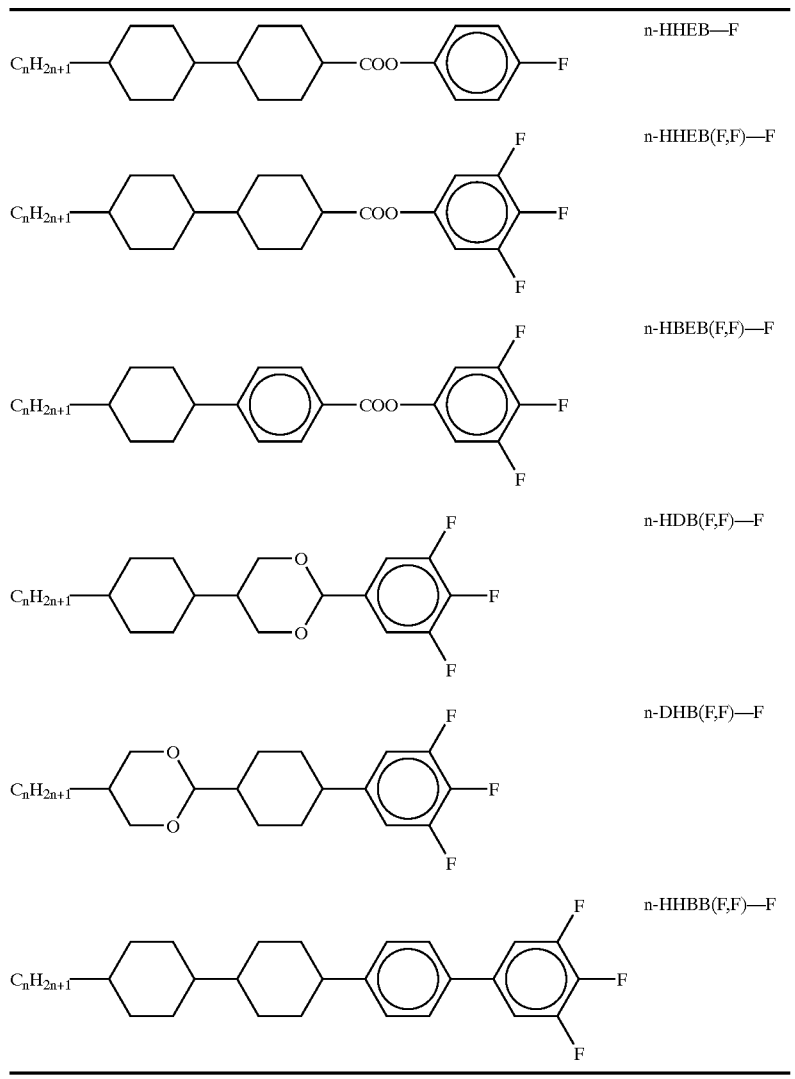

Example 1

Components shown below were mixed to prepare a liquid crystal medium

| First Component | |
|---|---|
| 1V2-BEB(F,F)—C | 17% |
| Second Component: | |
| 3-HH—VF2 | 30% |
| 5-HH—VF2 | 10% |
| Other Components: | |
| 3-HHEB—F | 7% |
| 5-HHEB—F | 7% |
| 3-HHEB(F,F)—F | 12% |
| 4-HHEB(F,F)—F | 3% |
| 5-HHEB(F,F)—F | 3% |
| 3-HDB(F,F)—F | 6% |
| 4-HDB(F,F)—F | 5% |

This liquid crystal medium had the following parameters:
SN: <−30° C.
NI: 70. 5° C.
$\gamma_1$: 83.2 mPa·sec
$\Delta\epsilon+$: 13.5
$\Delta n$: 0.0798
V. H. R.: 80.2%

An IPS display having this liquid crystal medium had a low address voltage of 4.2V and a short response time of 48 msec at 25° C. An image sticking was not observed.

Comparative Example 1

Components shown below were mixed to prepare a liquid crystal medium

| | |
|---|---|
| 5-HB—CL | 17% |
| 3-HHB(F,F)—F | 10% |
| 4-HHB(F,F)—F | 4% |
| 3-HBB(F,F)—F | 10% |
| 3-HHEB(F,F)—F | 10% |
| 4-HHEB(F,F)—F | 3% |
| 5-HHEB(F,F)—F | 3% |

| | |
|---|---|
| 2-HBEB(F,F)—F | 3% |
| 3-HBEB(F,F)—F | 5% |
| 5-HBEB(F,F)—F | 3% |
| 5-DHB(F,F)—F | 21% |
| 4-HHBB(F,F)—F | 5% |
| 5-HHBB(F,F)—F | 6% |

This liquid crystal medium had the following parameters:
SN: <−30° C.
NI: 69.9° C.
$\gamma_1$: 173.5 mPa·sec
$\Delta\epsilon$: +11.3
$\Delta n$: 0.0894
V. H. R. 94.2%

An IPS display having this liquid crystal medium had an address voltage of 5.0 V and a response time of 84 msec at 25° C. It had a higher address voltage and a longer response time as compared with those of the IPS display prepared in Example 1, and an image sticking was observed.

Comparative Example 2

Components shown below were mixed to prepare a liquid crystal medium.

| | |
|---|---|
| 3-HHB(F,F)—F | 8% |
| 3-H2HB(F,F)—F | 16% |
| 5-H2HB(F,F)—F | 10% |
| 3-HBB(F,F)—F | 27% |
| 4-DHB(F,F)—F | 10% |
| 5-DHB(F,F)—F | 20% |
| 4-HHBB(F,F)—F | 4% |
| 5-HHBB(F,F)—F | 5% |

This liquid crystal medium had the following parameters:
SN: <−30° C.
NI: 70.7° C.
$\gamma_1$: 227.7 mPa·sec
$\Delta\epsilon$: +11.4
$\Delta n$: 0.0897
V. H. R.: 94.5%

An IPS display having this liquid crystal medium had an address voltage of 5.0 V and a response time of 105 msec at 25° C. It had a higher address voltage and a longer response time as compared with those of the IPS display prepared in Example 1, and an image sticking was observed.

Example 2

Components shown below were mixed to prepare a liquid crystal medium.

| | |
|---|---|
| First component: | |
| 1V2-BEB(F,F)—C | 16% |
| Second component: | |
| 5-HH—VF2 | 30% |
| Other components: | |
| 3-HB—O2 | 8% |
| 3-HHEB—F | 8% |
| 5-HHEB—F | 6% |
| 3-HHEB(F,F)—F | 12% |
| 3-HDB(F,F)—F | 8% |
| 4-HDB(F,F)—F | 8% |
| 3-HH-4 | 4% |

This liquid crystal medium had the following parameters:
SN: <−20° C.
NI: 70.0° C.
$\gamma_1$: 87.5 mPa·sec
$\Delta\epsilon$: +12.5
$\Delta n$: 0.0807
V. H. R. 80.5%

An IPS display having this liquid crystal medium had a low address voltage of 4.4 V and a short response time of 49 msec at 25° C.

Example 3

Components shown below were mixed to prepare a liquid crystal medium.

| | |
|---|---|
| First component: | |
| 1V2-BEB(F,F)—C | 6% |
| 3-HB(F)—C | 16% |
| Second component: | |
| 3-HH—VF2 | 30% |
| 5-HH—VF2 | 12% |
| Third component: | |
| F2V—HHB-1 | 10% |
| F2V2-HHB-1 | 10% |
| Other components: | |
| 3-HB—O2 | 4% |
| 3-HHEB—F | 7% |
| 5-HHEB-F | 5% |

This liquid crystal medium had the following parameters:
SN: <−20° C.
NI: 70.9° C.
$\gamma_1$: 55.3 mPa·sec
$\Delta\epsilon$: +7.1
$\Delta n$: 0.0806
V. H. R.: 86.8%

Example 4

Components shown below were mixed to prepare a liquid crystal medium.

| | |
|---|---|
| First component: | |
| 1V2-BEB(F,F)—C | 10% |
| 3-HB(F)—C | 11% |
| Second component: | |
| 3-HH—VF2 | 32% |
| 5-HH—VF2 | 12% |

-continued

| Third component: | |
|---|---|
| F2V2-HHB-1 | 18% |
| Other components: | |
| 3-HHEB—F | 7% |
| 3-HHEB(F,F)—F | 10% |

This liquid crystal medium had the following parameters:
SN: <−20° C.
NI: 72.3° C.
$\gamma_1$: 60.7 mPa·sec
$\Delta\epsilon$: +9.3
$\Delta n$: 0.0818
V. H. R. 85.2%

An IPS display having this liquid crystal medium had a low address voltage of 5.9 V and a short response time of 29 msec at 25° C.

Example 5

Components shown below were mixed to prepare a liquid crystal medium.

| First component: | |
|---|---|
| 1V2-BEB(F,F)—C | 8% |
| Second component: | |
| 3-HH—VF2 | 32% |
| 5-HH—VF2 | 12% |
| Third component: | |
| F2V2-HHB-1 | 19% |
| Other components: | |
| 3-HB—C | 11% |
| 3-HB—O2 | 5% |
| 3-HHEB—F | 3% |
| 3-HHEB(F,F)—F | 10% |

This liquid crystal medium had the following parameters:
SN: <−30° C.
NI: 71.0° C.
$\gamma_1$: 54.7 mPa·sec
$\Delta\epsilon$: +7.4
$\Delta n$: 0.0819
V. H. R.: 86.5%

Example 6

Components shown below were mixed to prepare a liquid crystal medium.

| First component: | |
|---|---|
| 1V2-BEB(F,F)—C | 14% |
| Second component: | |
| 3-HH—VF2 | 30% |
| 5-HH—VF2 | 13% |
| Third component: | |
| F2V—HHB-1 | 7% |

-continued

| Other components: | |
|---|---|
| 3-HB—O2 | 9% |
| 3-HHEB—F | 7% |
| 5-HHEB—F | 7% |
| 3-HHEB(F,F)—F | 10% |
| 2-HBEB(F,F)—F | 3% |

This liquid crystal medium had the following parameters:
SN: <−20° C.
NI: 70.6° C.
$\gamma_1$: 61.6 mPa·sec
$\Delta\epsilon$: +9.9
$\Delta n$: 0.0814
V. H. R.: 85.2%

Example 7

Components shown below were mixed to prepare a liquid crystal medium.

| First component: | |
|---|---|
| 1V2-BEB(F,F)—C | 6% |
| 3O1-BEB(F)—C | 3% |
| Second component: | |
| 3-HH—VF2 | 11% |
| Other components: | |
| 3-HB—O2 | 5% |
| 2-HHB(F)—F | 14% |
| 3-HHB(F)—F | 15% |
| 5-HHB(F)—F | 14% |
| 3-HHEB—F | 4% |
| 3-HHEB(F,F)—F | 8% |
| 3-HHB(F,F)—F | 4% |
| 3-H2HB(F,F)—F | 4% |
| 2-HDB(F,F)—F | 3% |
| 3-HDB(F,F)—F | 3% |
| 4-HDB(F,F)—F | 3% |
| 5-HDB(F,F)—F | 3% |

This liquid crystal medium had the following parameters:
SN: <−30° C.
NI: 81.7° C.
$\gamma_1$: 87.8 mPa·sec
$\Delta\epsilon$: +11.0
$\Delta n$: 0.0818
V. H. R.: 85.7%

Example 8

Components shown below were mixed to prepare a liquid crystal medium.

| First component: | |
|---|---|
| 3-BEB(F)—C | 9% |
| Second component: | |
| 3-HH—VF2 | 10% |
| Third component: | |
| F2V—HHB-1 | 5% |

-continued

| Other components: | |
|---|---|
| 3-HB—O2 | 17% |
| 3-HHB(F,F)—F | 10% |
| 4-HHB(F,F)—F | 5% |
| 3-H2HB(F,F)—F | 7% |
| 3-HHEB—F | 5% |
| 5-HHEB—F | 5% |
| 3-HHEB(F,F)—F | 10% |
| 4-HHEB(F,F)—F | 3% |
| 5-HHEB(F,F)—F | 3% |
| 2-HBEB(F,F)—F | 3% |
| 3-HBEB(F,F)—F | 5% |
| 5-HBEB(F,F)—F | 3% |

This liquid crystal medium had the following parameters:
SN: <−20° C.
NI: 74.0° C.
$\gamma_1$: 81.0 mPa·sec
$\Delta\epsilon$: +11.0
$\Delta n$: 0.0870
V. H. R.: 85.1%

Industrial Applicability

As shown in the examples, the liquid crystal medium of an IPS mode controlling suitably a volttage holding ratio and having a low address voltage and a short response time has been able to be obtained according to the present invention. This liquid crystal medium has made it possible to provide an electro-optical liquid crystal display of an IPS mode causing no image sticking and having a high grade.

What is claimed is:

1. A process which comprises conducting an in-plane switching (IPS), by using a liquid crystal medium comprising 5 to 37.5% by weight of at least one compound as a first component selected from the group consisting of compounds represented by Formula (I), 5 to 62.5% by weight of at least one compound as a second component selected from the group consisting of compounds represented by Formula (II), said liquid crystal medium excluding a compound having a negative dielectric anisotropy, wherein the first component is a compound represented by Formula (I):

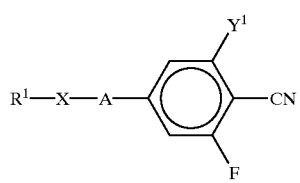
(I)

(wherein $R^1$ represents an alkyl group, an alkoxy group or an oxalkyl group (containing 1 to 4 oxygen atoms) having 1 to 10 carbon atoms, or an alkenyl group having 2 to 10 carbon atoms; X represents transcyclohexylene or phenylene; A represents —CO—O— or a single bond; and $Y^1$ represents a hydrogen atom or a fluorine atom), and the second component is a compound represented by Formula (II):

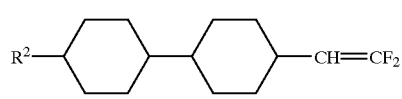
(II)

(wherein $R^2$ represents an alkyl group, an alkoxy group or an oxalkyl group (containing 1 to 4 oxygen atoms) having 1 to 10 carbon atoms, or an alkenyl group having 2 to 10 carbon atoms).

2. The process as described in claim 1, wherein the liquid crystal medium comprises the compound represented by Formula (1) in which X is phenylene, and A is —CO—O—.

3. A process which comprises conducting an in-plane switching (IPS), by using a liquid crystal medium comprising 5 to 37.5% by weight of at least one compound as a first component selected from the group consisting of compounds represented by Formula (I), 5 to 62.5% by weight of at least one compound as a second component selected from the group consisting of compounds represented by Formula (II), 5 to 37.5% by weight of at least one compound as a third component selected from the group consisting of compounds represented by Formula (III), said liquid crystal medium excluding a compound having a negative dielectric anisotropy, wherein the first component is a compound represented by Formula (I):

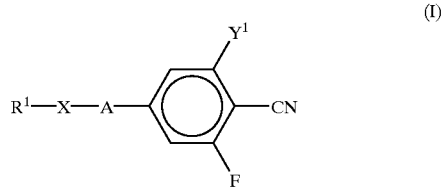
(I)

(wherein $R^1$ represents an alkyl group, an alkoxy group or an oxalkyl group (containing 1 to 4 oxygen atoms) having 1 to 10 carbons atoms, or an alkenyl group having 2 to 10 carbon atoms; X represents transcyclohexylene or phenylene; A represents —CO—O— or a single bond; and $Y^1$ represents a hydrogen atom or a fluorine atom); the second component is a compound represented by Formula (II):

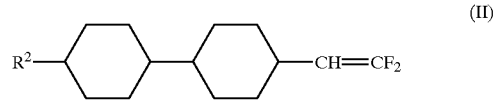
(II)

(wherein $R^2$ represents an alkyl group, an alkoxy group or an oxalkyl group (containing 1 to 4 oxygen atoms) having 1 to 10 carbon atoms, or an alkenyl group having 2 to 10 carbon atoms); and the third component is a compound represented by Formula (III):

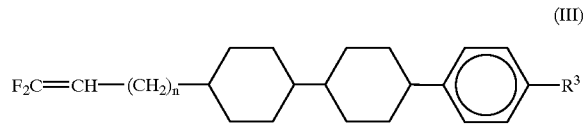
(III)

(wherein n is 0 or 2, and $R^3$ represents an alkyl group, an alkoxy group or an oxalkyl group (containing 1 to 4 oxygen atoms) having 1 to 10 carbon atoms, or an alkenyl group having 2 to 10 carbon atoms).

4. The process as described in claim 3, wherein the liquid crystal medium comprises the compound represented by Formula (I) in which X is phenylene, and A is —CO—O—.

5. The process as described in claim 3, wherein the liquid crystal medium comprises the compound represented by Formula (I) in which $R^1$ is a linear alkenyl group having 2 to 10 carbon atoms and X is phenylene and in which A is —CO—O—; the compound represented by Formula (II) in which $R^2$ is a linear alkyl group having 1 to 10 carbon atoms or a linear alkenyl group having 2 to 10 carbon atoms; and the compound represented by Formula (III) in which $R^3$ is a linear alkyl group having 1 to 10 carbon atoms or a linear alkenyl group having 2 to 10 carbon atoms.

6. The process as described in any one of claims 1, 2–5 or 3, wherein the voltage holding ratio is controlled to 40 to 90%.

7. An active matrix type liquid crystal display element for an IPS mode display, which comprises a liquid crystal medium comprising 5 to 37.5% by weight of at least one compound as a first component selected from the group consisting of compounds represented by Formula (I), 5 to 62.5% by weight of at least one compound as a second component selected from the group consisting of compounds represented by Formula (II), said liquid crystal medium excluding a compound having a negative dielectric anisotropy, wherein the first component is a compound represented by Formula (I):

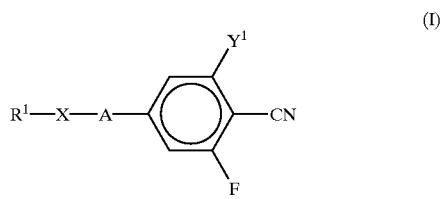
(I)

(where $R^1$ represents an alkyl group, an alkoxy group or an oxalky group (containing 1 to 4 oxygen atoms) having 1 to 10 carbon atoms, or an alkenyl group having 2 to 10 carbon atoms; X represents transcyclohexylene or phenylene; A represents —CO—O— or a single bond; and $Y^1$ represents a hydrogen atom or a fluorine atom), and the second component is a compound represented by Formula (II):

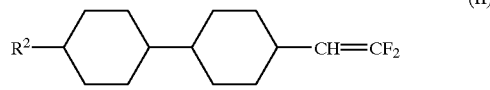
(II)

(wherein $R^2$ represents an alkyl group, an alkoxy group or an oxalkyl group (containing 1 to 4 oxygen atoms) having 1 to 10 carbon atoms, or an alkenyl group having 2 to 10 carbon atoms), wherein a product of a optical anisotropy (Δn) and a cell thickness (d) of the liquid crystal medium has a value falling in a range of 200 to 350 nm.

8. The liquid crystal display element as described in claim 7, wherein the liquid crystal medium comprises the compound represented by Formula (I) in which X is phenylene, and A is —CO—O—.

9. An active matrix type liquid crystal display element for an IPS mode display, which comprises a liquid crystal medium comprising 5 to 37.5% by weight of at least one compound as a first component selected from the group consisting of compounds represented by Formula (I), 5 to 62.5% by weight of at least one compound as a second component selected from the group consisting of compounds represented by Formula (II), 5 to 37.5% by weight of at least one compound as a third component selected from the group consisting of compounds represented by Formula (III), said liquid crystal medium excluding a compound having a negative dielectric anisotropy, wherein the first component is a compound represented by Formula (I):

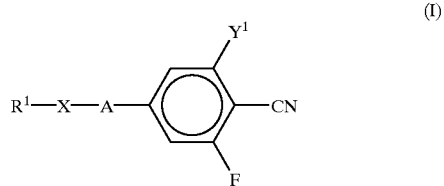
(I)

(wherein $R^1$ represents an alkyl group, an alkoxy group or an oxalkyl group (containing 1 to 4 oxygen atoms) having 1 to 10 carbon atoms, or an alkenyl group having 2 to 10 carbon atoms; X represents transcyclohexylene or phenylene; A represents —CO—O— or a single bond; and $Y^1$ represents a hydrogen atom or a fluorine atom); the second component is a compound represented by Formula (II):

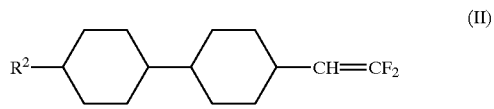
(II)

(wherein $R^2$ represents an alkyl group, an alkoxy group or an oxalkyl group (containing 1 to 4 oxygen atoms) having 1 to 10 carbon atoms, or an alkenyl group having 2 to 10 carbon atoms); and the third component is a compound represented by Formula (III):

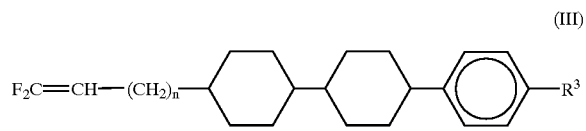
(III)

(wherein n is 0 or 2, and $R^3$ represents an alkyl group, an alkoxy group or an oxalkyl group (containing 1 to 4 oxygen atoms) having 1 to 10 carbon atoms, or an alkenyl group having 2 to 10 carbon atoms), wherein a product of a optical anisotropy (Δn) and a cell thickness (d) of the liquid crystal medium has a value falling in a range of 200 to 350 nm.

10. The liquid crystal display element as described in claim 9, wherein the liquid crystal medium comprises the compound represented by Formula (I) in which X is phenylene, and A is —CO—O—.

11. The liquid crystal display element as described in claim 9, Wherein the liquid crystal medium comprises the compound represented by Formula (I) in which $R^1$ is a linear alkenyl group having 2 to 10 carbon atoms and X is phenylene and in which A is —CO—O—; the compound represented by Formula (II) in which $R^2$ is a linear alkyl group having 1 to 10 carbon atoms or a linear alkenyl group having 2 to 10 carbon atoms; and the compound represented by Formula (III) in which $R^3$ is a linear alkyl group having 1 to 10 carbon atoms or a linear alkenyl group having 2 to 10 carbon atoms.

12. An IPS mode display provided with the liquid crystal display element as described in any one of claims 7–11.

13. An active matrix type liquid crystal display element for an IPS mode display, which comprises a liquid crystal medium comprising 5 to 37.5% by weight of at least one compound as a first component selected from the group consisting of compounds represented by Formula (I), 5 to 62.5% by weight of at least one compound as a second component -selected from the group consisting of compounds represented by Formula (II), said liquid crystal medium excluding a compound having a negative dielectric anisotropy, wherein the first component is a compound represented by Formula (I):

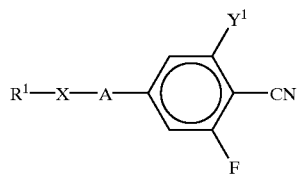

(I)

(wherein $R^1$ represents an alkyl group, an alkoxy group or an oxalkyl group (containing 1 to 4 oxygen atoms) having 1 to 10 carbon atoms, or an alkenyl group having 2 to 10 carbon atoms; X represents transcyclohexylene or phenylene; A represents —CO—O— or a single bond; and $Y^1$ represents a hydrogen atom or a fluorine atom), and the second component is a compound represented by Formula (II);

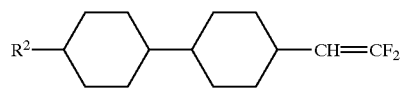

(II)

(wherein $R^2$ represents an alkyl group, an alkoxy group or an oxalkyl group (containing 1 to 4 oxygen atoms) having 1 to 10 carbon atoms, or an alkenyl group having 2 to 10 carbon atoms), wherein a product of a optical anisotropy (Δn) and a cell thickness (d) of the liquid crystal medium has a value falling in a range of 200 to 350 nm, and wherein the voltage holding ratio is controlled to 40 to 90%.

14. The liquid crystal display element as described in claim 13, wherein the liquid crystal mediums comprises the compound represented by Formula (I) in which X is phenylene, and A is —CO—O—.

15. An active matrix type liquid crystal display element for an IPS mode display, which comprises a liquid crystal medium comprising 5 to 37.5% by weight of at least one compound as a first component selected from the group consisting of compounds represented by Formula (I), 5 to 62.5% by weight of at least one compound as a second component selected from the group consisting of compounds represented by Formula (II), 5 to 37.5% by weight of at least one compound as a third component selected from the group consisting of compounds represented by Formula (III), said liquid crystal medium excluding a compound having a negative dielectric anisotropy, wherein the first component is a compound represented by Formula (I):

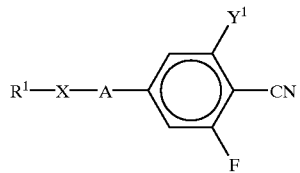

(I)

(wherein $R^1$ represents an alkyl group, an alkoxy group or an oxalkyl group (containing 1 to 4 oxygen atoms) having 1 to 10 carbon atoms, or an alkenyl group having 2 to 10 carbon atoms; X represents transcyclohexylene or phenylene; A represents —CO—O— or a single bond; and $Y^1$ represents a hydrogen atom or a fluorine atom); the second component is a compound represented by Formula (II):

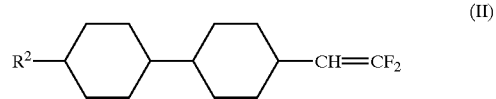

(II)

(wherein $R^2$ represents an alkyl group, an alkoxy group or an oxalkyl group (containing 1 to 4 oxygen atoms) having 1 to 10 carbon atoms, or an alkenyl group having 2 to 10 carbon atoms); and the third component is a compound represented by Formula (III):

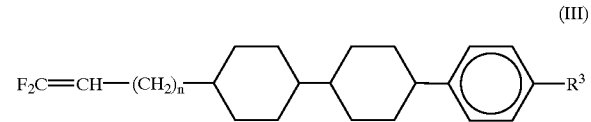

(III)

(wherein n is 0 or 2, and $R^3$ represents an alkyl group, an alkoxy group or an oxalkyl group (containing 1 to 4 oxygen atoms) having 1 to 10 carbon atoms, or an alkenyl group having 2 to 10 carbon atoms), wherein a product of a optical anisotropy (Δn) and a cell thickness (d) of the liquid crystal medium has a value falling in a range of 200 to 350 nm, and wherein the voltage holding ratio is controlled to 40 to 90%.

16. The liquid crystal display element as described in claim 15, wherein the liquid crystal medium comprises the compound represented by Formula (I) in which X is phenylene, and A is —CO—O—.

17. The liquid crystal display element as described in claim 15, wherein the liquid crystal medium comprises the compound represented by Formula (I) in which $R^1$ is a linear alkenyl group having 2 to 10 carbon atoms and X is phenylene and in which A is —CO—O—; the compound represented by Formula (II) in which $R^2$ is a linear alkyl group having 1 to 10 carbon atoms or a linear alkenyl group having 2 to 10 carbon atoms; and the compound represented by Formula (III) in which $R^3$ is a linear alkyl group having 1 to 10 carbon atoms or a linear alkenyl group having 2 to 10 carbon atoms.

18. An IPS mode display provided with the liquid crystal display element as described in any one of claims 13–17.

* * * * *